(12) United States Patent
Ma (10) Patent No.: US 10,624,460 B2
(45) Date of Patent: Apr. 21, 2020

(54) LIGHTED CHAIR BASE AND LIGHTED CHAIR BACK

(71) Applicant: Hung Trien Ma, Diamond Bar, CA (US)

(72) Inventor: Hung Trien Ma, Diamond Bar, CA (US)

( * ) Notice: Subject to any disclaimer, the term of this patent is extended or adjusted under 35 U.S.C. 154(b) by 0 days.

(21) Appl. No.: 15/964,978

(22) Filed: Apr. 27, 2018

(65) Prior Publication Data

US 2019/0328142 A1 Oct. 31, 2019

(51) Int. Cl.
| | | |
|---|---|---|
| *A47C 7/72* | (2006.01) | |
| *F21V 8/00* | (2006.01) | |
| *F21S 9/02* | (2006.01) | |
| *F21W 131/301* | (2006.01) | |
| *F21Y 115/10* | (2016.01) | |
| *H05B 45/00* | (2020.01) | |

(52) U.S. Cl.
CPC .............. *A47C 7/725* (2013.01); *F21S 9/02* (2013.01); *G02B 6/0078* (2013.01); *G02B 6/0083* (2013.01); *G02B 6/0091* (2013.01); *F21W 2131/301* (2013.01); *F21Y 2115/10* (2016.08); *G02B 6/0068* (2013.01); *H05B 45/00* (2020.01)

(58) Field of Classification Search
CPC .............. A47C 7/725; F21W 2131/301; F21V 33/0012
USPC ......................................................... 362/131
See application file for complete search history.

(56) References Cited

U.S. PATENT DOCUMENTS

| | | | | |
|---|---|---|---|---|
| 6,854,869 B1 * | 2/2005 | Fernandez | ............ | A47C 7/725 297/184.17 |
| 6,866,394 B1 * | 3/2005 | Hutchins | ................ | E01F 9/582 362/192 |
| 7,735,918 B2 * | 6/2010 | Beck | .................... | A47C 1/0242 297/217.3 |
| 9,375,093 B1 * | 6/2016 | Shin | ......................... | A47C 3/00 |
| 10,085,562 B1 * | 10/2018 | Labrosse | ................ | A47B 9/00 |
| 2002/0116846 A1 * | 8/2002 | Wu | ............................ | G09F 7/00 40/320 |
| 2005/0201080 A1 * | 9/2005 | Seward | .................. | A47C 7/725 362/97.2 |
| 2012/0098306 A1 * | 4/2012 | Jarnagin | ................ | A47C 7/725 297/217.6 |

(Continued)

FOREIGN PATENT DOCUMENTS

DE 202018102767 U1 * 5/2018 ............. A47C 7/004

*Primary Examiner* — Christopher M Raabe
(74) *Attorney, Agent, or Firm* — Rosenberg, Klein & Lee (57) ABSTRACT

The lighted chair base comprises a base plate, a base case, a power source, a controller and at least one light emitter. The base case is coupled to the base plate, and comprises an accommodation space. The power source is disposed on the base plate and located within the accommodation space. The controller is located within the accommodation space and electrically coupled to the power source. The at least one light emitter is located within the accommodation space and electrically coupled to the controller. The lighted chair back is also disclosed, comprising a main body, a power source, a controller and at least one light emitter. The power source is coupled to the main body. The controller is electrically coupled to the power source. The at least one light emitter is disposed on the main body and electrically coupled to the controller.

14 Claims, 14 Drawing Sheets

(56) References Cited

U.S. PATENT DOCUMENTS

2015/0300627 A1\* 10/2015 Wang .................. F21V 33/0012
  108/23
2015/0360784 A1\* 12/2015 Maslakow ......... B64D 11/0644
  297/411.2
2018/0226004 A1\* 8/2018 Lin ......................... G09F 13/06

\* cited by examiner

LIGHTED CHAIR BASE AND LIGHTED CHAIR BACK

TECHNICAL FIELD OF THE INVENTION

The present application generally relates to lighted chair accessories, and more particularly, to a lighted chair base and a lighted chair back.

BACKGROUND OF THE INVENTION

The customer demand for product technology, computerization and personalization increases as the technological improvement. In the meantime, it is particularly urgent for the demand of dazzled effect of electronic device in the market. In addition, not only the decoration purpose, lighting system is also useful in the rooms where light is preferred at specific times and locations such as evening or night office. For example, chair is a product that people may use every day. However, it is easy for passerby to get injured when chairs are placed in walkway or office rooms without turning light.

Therefore, a need remains for lighted chair accessories such as lighted chair base and lighted chair back to meet the demands of the market and customers and also provide a safer environment.

SUMMARY OF THE INVENTION

The present application discloses a lighted chair base and a lighted chair back to meet the demands of market and customers and also for providing a safer environment to the user.

The lighted chair base comprises a base plate, a base case, a power source, a controller and at least one light emitter. The base case is coupled to the base plate, and comprises an accommodation space. The power source is disposed on the base plate and located within the accommodation space. The controller is located within the accommodation space and electrically coupled to the power source. The at least one light emitter is located within the accommodation space and electrically coupled to the controller.

In various exemplary embodiments, light emitter is a light emitting diode.

In various exemplary embodiments, the base plate comprises at least one slot. The lighted chair base further comprises at least one light guider disposed on the base plate, wherein the at least one light guider is capable of guiding light emitted from the at least one light emitter through the at least one slot.

According to an exemplary embodiment of the lighted chair base, the base plate comprises a central base plate and a plurality of peripheral base plates. The plurality of peripheral base plates comprises five peripheral base plates. The lighted chair base comprises five light guiders disposed on the five peripheral base cases correspondingly.

According to the other exemplary embodiment, the base plate comprises a central base plate and a plurality of peripheral base plates. The base case comprises a central base case and a plurality of peripheral base cases. The plurality of peripheral base cases comprises five peripheral base cases. The central base plate and the plurality of peripheral base plates are orthographic projections of the central base case and the plurality of peripheral base cases correspondingly.

According to the other exemplary embodiment, the light emitter comprises a light emitting surface, the light guider comprises a front surface, a rear surface, a right side surface, a left side surface, a top surface and a bottom surface facing the base plate, wherein the light emitting surface faces the bottom surface of the light guider.

According to the other exemplary embodiment, the light emitter comprises a light emitting surface, the light guider comprises a front surface, a rear surface, a right side surface, a left side surface, a top surface and a bottom surface facing the base plate, wherein the light emitting surface faces the from surface of the light guider.

The lighted chair back comprises a main body, a power source, a controller and at least one light emitter. The main body comprises a front side and a rear side. The power source is coupled to the main body. The controller is electrically coupled to the power source. The at least one light emitter is disposed on the main body and electrically coupled to the controller.

According to an exemplary embodiment of the lighted chair back, the at least one light emitter is disposed at the front side of the main body. The lighted chair back further comprises at least one front frame and at least one light guider. The at least one front frame is disposed between the front side of the main body and the at least one light emitter. The at least one light guider is disposed between the at least one front frame and the at least one light emitter.

According to the other exemplary embodiment, the at least one light emitter is disposed at the rear side of the main body. The lighted chair back further comprises a rear frame disposed between the rear side of the main body and the at least one light emitter.

In various exemplary embodiments, the light emitter is a light emitting diode.

In various exemplary embodiments, the power source is a rechargeable battery.

Based on the above, the present application provides a safer environment since the light emitters are installed in the chair base and the chair back, preventing people from getting injured when passing it without turning light. In addition, a more market-oriented and personalized chair can be further achieved since the light guiders are installed in the chair base and the chair back, allowing users to set up or select the desired light effect.

Numerous other advantages and features of the present application will become readily apparent from the following detailed description of disclosed embodiments, from the claims and from the accompanying drawings.

BRIEF DESCRIPTION OF THE DRAWINGS

The objects, features and advantages of the present application will be more readily appreciated upon reference to the following disclosure when considered in conjunction with the accompanying drawings, wherein like reference numerals are used to identify identical components in the various views, and wherein reference numerals with alphabetic characters are utilized to identify additional types, instantiations or variations of a selected component embodiment in the various views, in which:

FIGS. 6A-9B are views showing different embodiments of the lighted chair base.

DETAILED DESCRIPTION OF DISCLOSED EMBODIMENTS

Reference will now be made in detail to the present representative embodiments of the present application, examples of which are illustrated in the accompanying drawings. Wherever possible, the e reference numbers are used in the drawings and the description to refer to the same or like parts.

Figure 1:
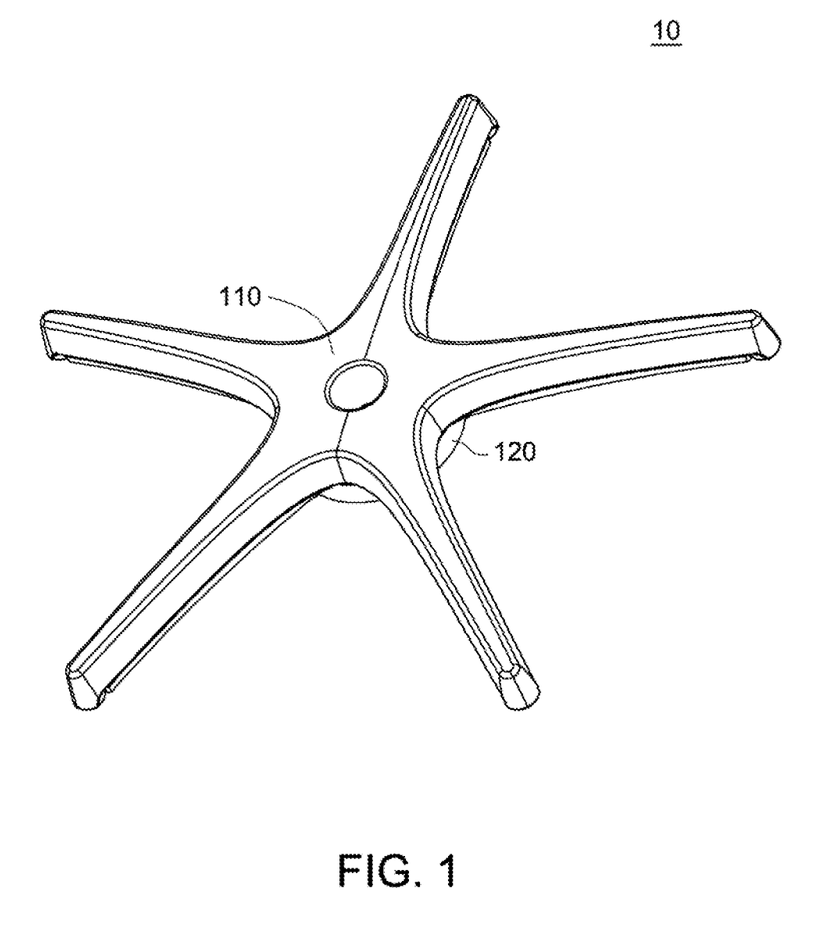
FIG. 1 is a perspective view of a lighted chair base.
Figure 2:
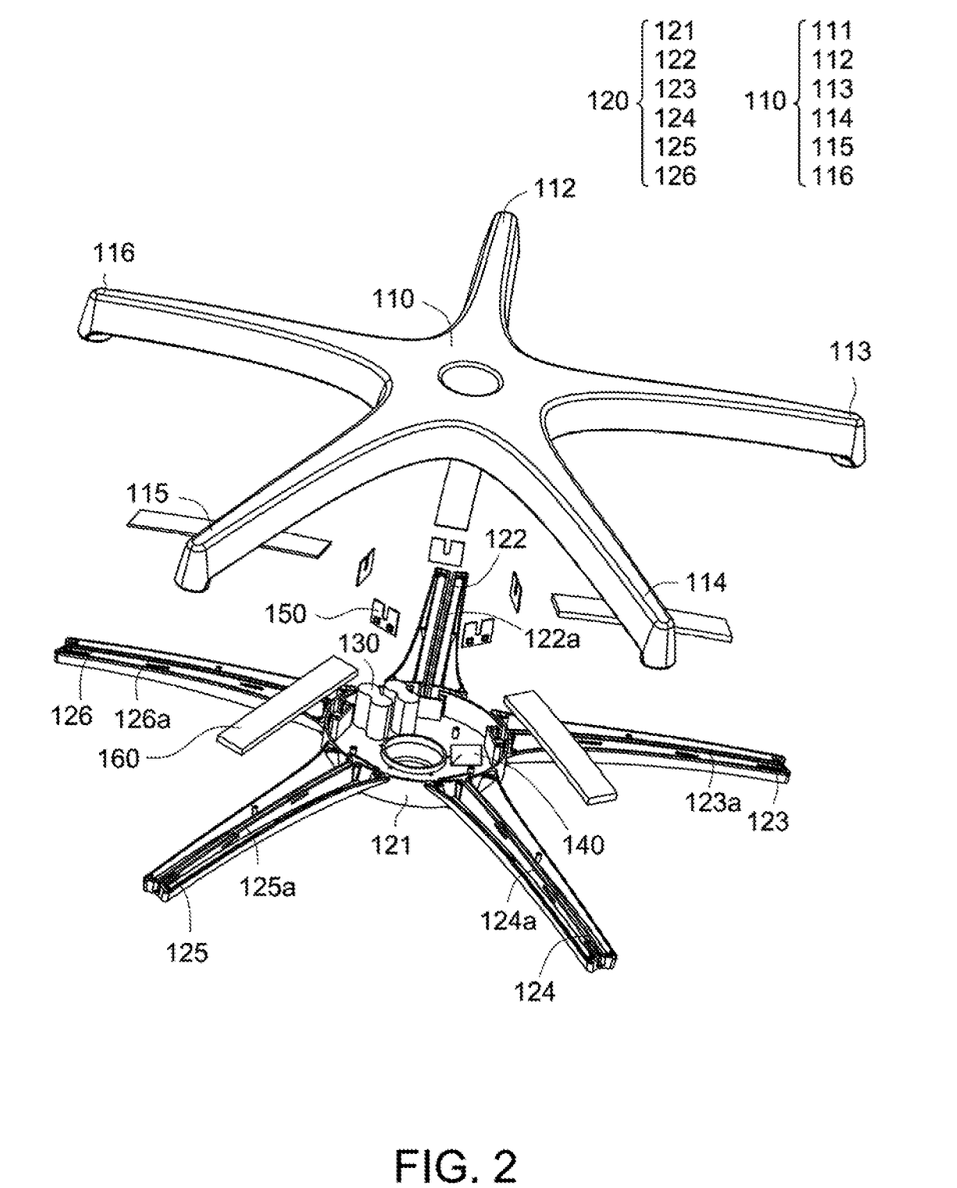
FIG. 2 is an explosive view of the lighted chair base.
Figure 3:
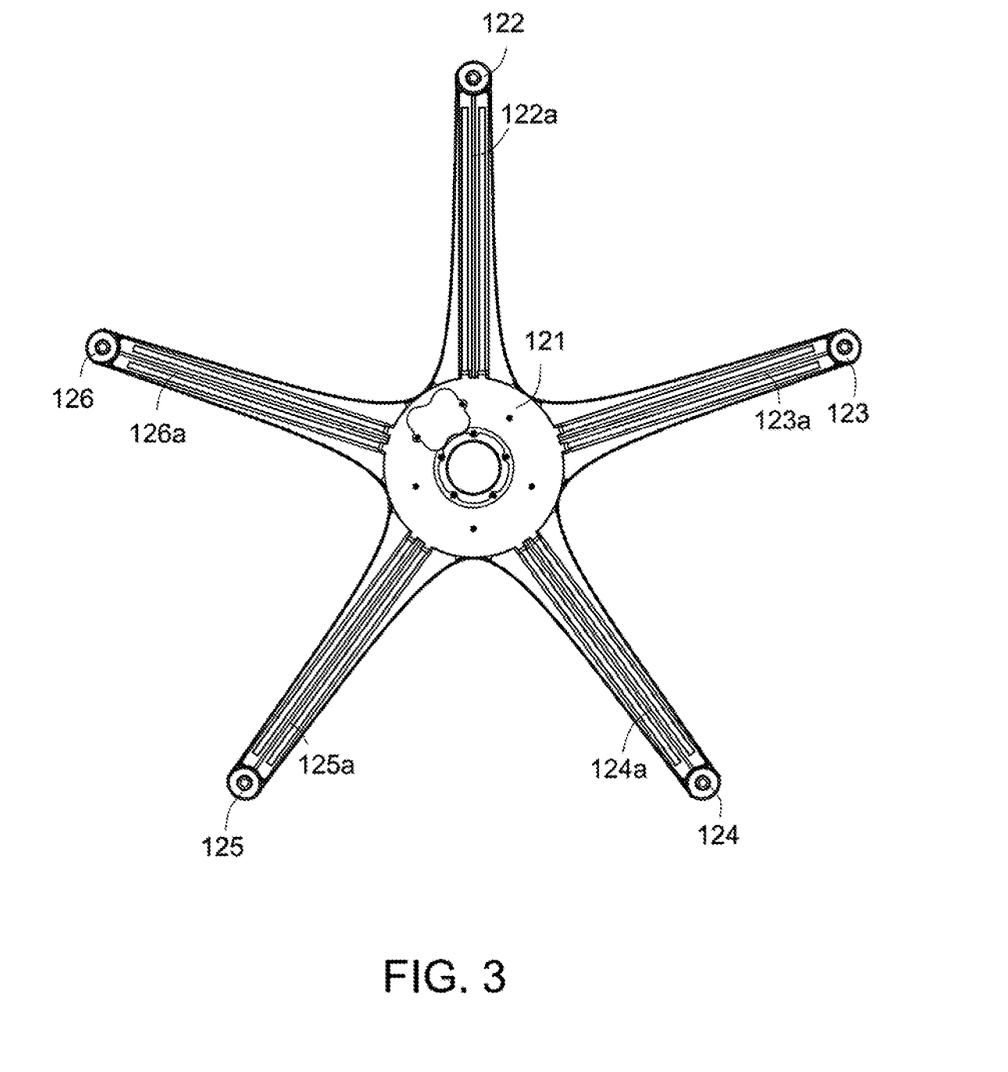
FIG. 3 is a bottom view of the lighted chair base.

FIG. 1 is a perspective view of a lighted chair base 10. FIG. 2 is an explosive view of the lighted chair base 10. FIG. 3 is a bottom view of the lighted chair base 10.

Referring to FIGS. 1-3, the lighted chair base 10 comprises a base case 110 and a base plate 120. The base case 110 is coupled to the base plate 120 and comprises an accommodation space. A power source 130, a controller 140, light emitters 150 and light guiders 160 are located within the accommodation space.

The shape of the base case 110 and the base plate 120 is star-like. Specifically, the base case 110 comprises a central base case 111 and a plurality of peripheral base cases. In detail, there are five peripheral base cases 112/113/114/115/116. In addition, the base plate 120 also comprises a central base plate 121 and a plurality of peripheral base plates. There are five peripheral base plates 122/123/124/125/126. The central base plate 121 and the plurality of peripheral base plates 122/123/124/125/126 are orthographic projections of the central base case 111 and the plurality of peripheral base cases 112/113/114/115/116 correspondingly.

However, the present application is not limited thereto, the base case 110 and the base plate 120 can have different shape as long as the power source 130, the controller 140, the light emitter 140 and the light guiders 160 can be located within the accommodation space and achieve the light effect as shown in the present application.

The power source 130 is disposed on the base plate 120. The power source 130 can be any kind of power source such as rechargeable battery or a power supply. As a rechargeable battery, the power source 130 can supply the light emitter 150 without the influence of the cable. As a power supply, the power source 130 can supply the light emitter 150 more stable. The present application is not limited thereto. In addition, the coupling method is not limited either, the power source 130 can be charged via magnetic coupling or socket connector.

The controller 140 is electrically coupled to the power source 130. Specifically, the controller 140 comprises control chips for controlling the brightness and switching the light emitter 150. The controller 140 can be controlled either by wire control or wireless control. For example, the user can send the control signal to the controller 140 by the remote control via a cable or wirelessly. Or, the user may also send the control signal to the controller 140 via mobile app. After receiving the control signal, the controller 140 then may control the light emitter 150 for brightness and color. The controller 140 may be disposed on the base plate 120 or attached to the base case 110, the present application is not limited thereto as long as the controller 140 is within the accommodation space.

The light emitters 150 are electrically coupled to the controller 140. Specifically, there are five sets of light emitters 150 located on the central base plate 121 in the present application. The light emitters 150 in the present application are light emitting diodes and can display color individually. However, the present application is not limited thereto, the light emitters 150 can also be other light emitting elements such as organic light emitting diode. In addition, the amount of light emitters 150 may also be modified if needed, the present application is not limited thereto either.

The light guiders 160 are disposed on the base plate 120. Specifically, there are five light guiders 160 in the chair base 10. Each of the light guiders 160 located on different peripheral base plates 122/123/124/125/126.

The base plate 120 comprises slots. Specifically, each of the peripheral base plates 122/123/124/125/126 comprises its own slot 122a/123a/124a/125a/126a. The light guiders 160 are capable of guiding light emitted from the light emitters 150 through the slots 122a/123a/124a/125a/126a.

Figure 4:
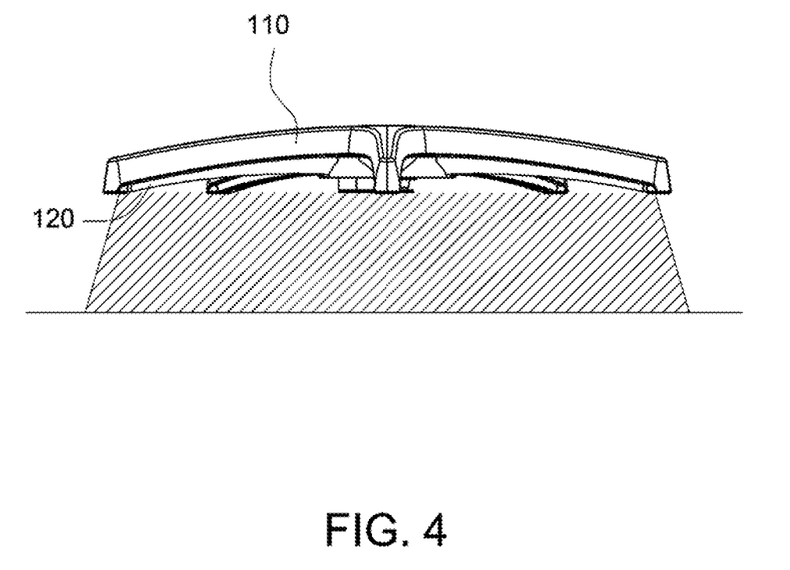
FIG. 4 is a side view of the lighted chair base after turning on the light emitter.

FIG. 4 is a side view of the lighted chair base 10 after turning on the light emitter 150.

As shown in FIG. 4, the controller 140 may control the light emitter 150 after the user sends the control signal. Then, the light from the light emitter 150 may at least pass through the slots 122a/123a/124a/125a/126a to illuminate the outside area.

FIGS. 5A-5D are views showing different configurations of light emitting elements.

Referring to FIG. 2 and FIGS. 5A-5D, each of the light emitters 150 comprises a light emitting surface. Each of the light guiders 160 comprises a front surface, a rear surface, a right side surface, a left side surface, a top surface and a bottom surface facing the base plate.

Figure 5A:
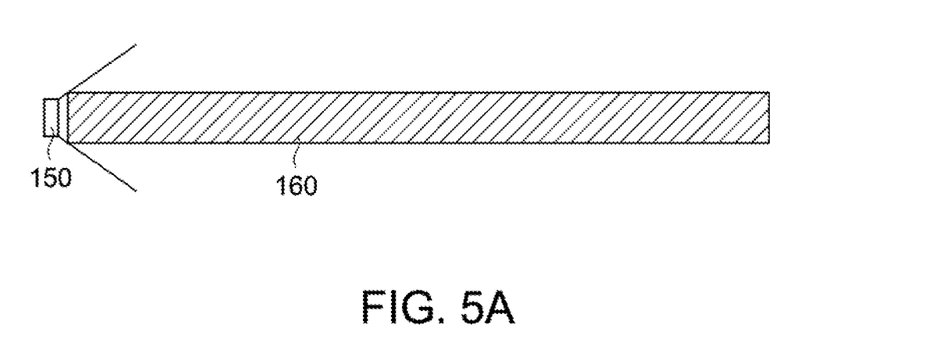
FIGS. 5A-5D are views showing different configurations of light emitting elements.
Figure 5B:
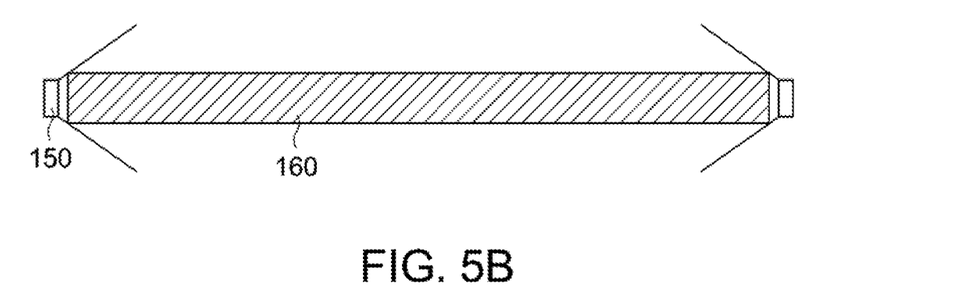

As shown in FIG. 5A and FIG. 2, the light emitting surface faces the front surface of the light guider 160. However, the present application is not limited thereto, the chair base 10 (referring to FIG. 1) may also comprise double sets of light emitters 150. For example, referring to FIG. 5B, the light surfaces of the light emitters 150 may also face both side, the front surface and the rear surface, of the light guider 160. In this case, the light emitters 150 may not only be disposed on the central base plate 121, but also located on distal ends of each of the peripheral base plates 122/123/124/125/126.

Figure 5C:
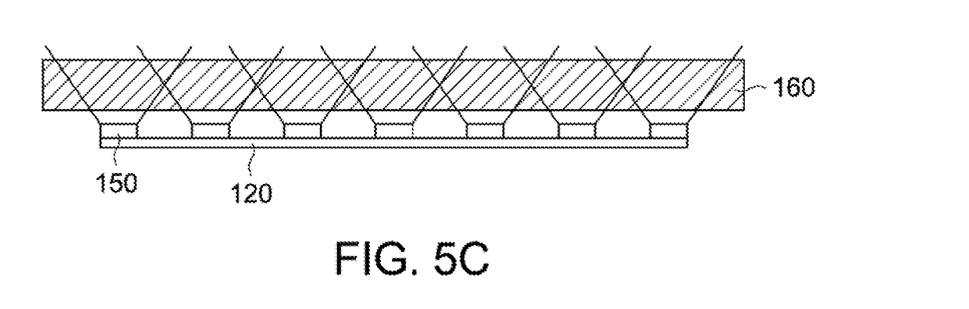

Furthermore, the present application may also comprise multiple sets of light emitters 150. For instance, as shown in FIG. 5C, the light surfaces of the light emitters 150 may face the bottom surface of the light guiders 160. In this case, the light emitters 150 may not only be disposed on the central base plate 121, but also located along each of the peripheral base plates 122/123/124/125/126.

Figure 5D:
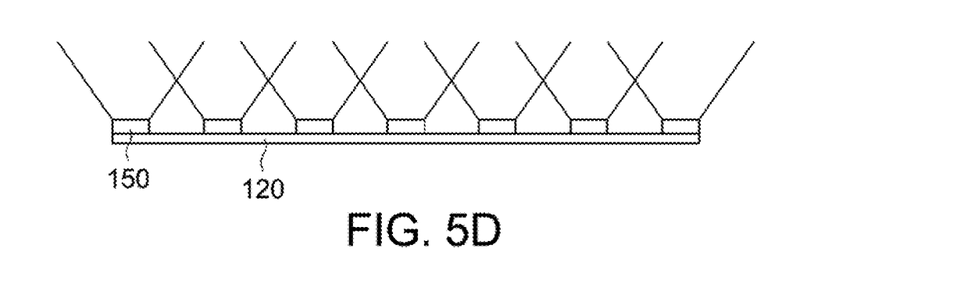

Or, as shown in FIG. 5D, the light from the light emitters 150 may also illuminate the outside area without passing through the light guiders 160. The present application is not limited thereto, the light guiders 160 can be installed within the chair base 10 (referring to FIG. 1) by user demand.

FIGS. 6A-9B are views showing different embodiments of the lighted chair base.

Figure 6A:
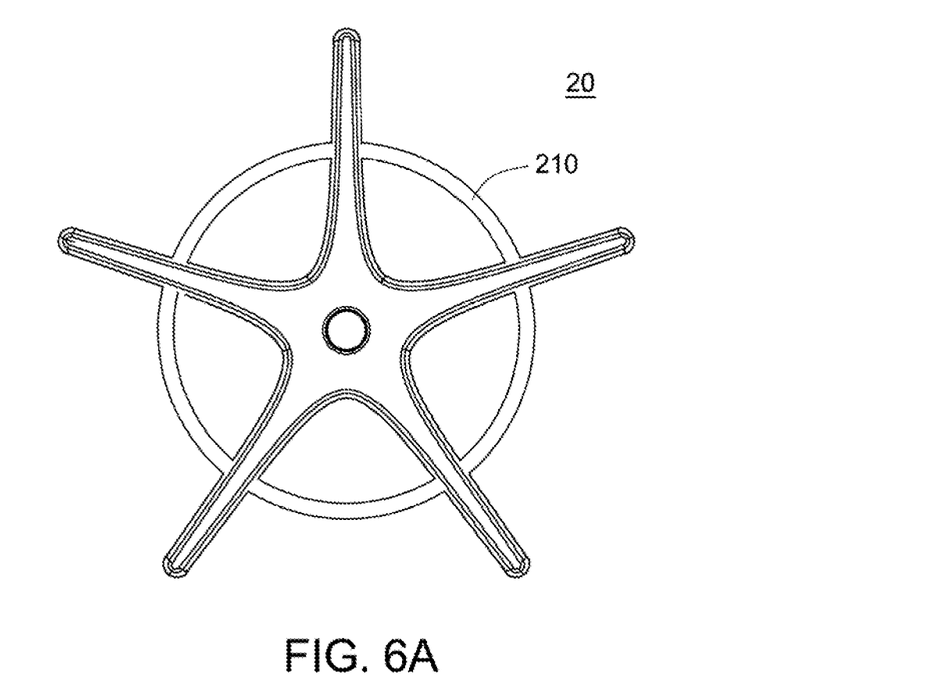
Figure 6B:
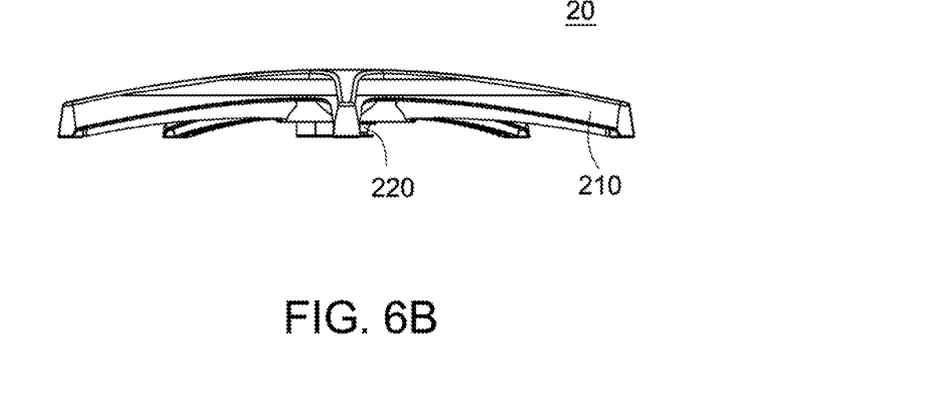

Referring to FIGS. 6A-6B, a second embodiment of the lighted chair base 20 is also disclosed in the present application. The only difference between the lighted chair base 10 (referring to FIG. 1) and lighted chair base 20 is the shape of the base case 210. Specifically, the base case 210 of the lighted chair base 20 is a star-like shape with a ring structure in the middle.

Figure 7A:
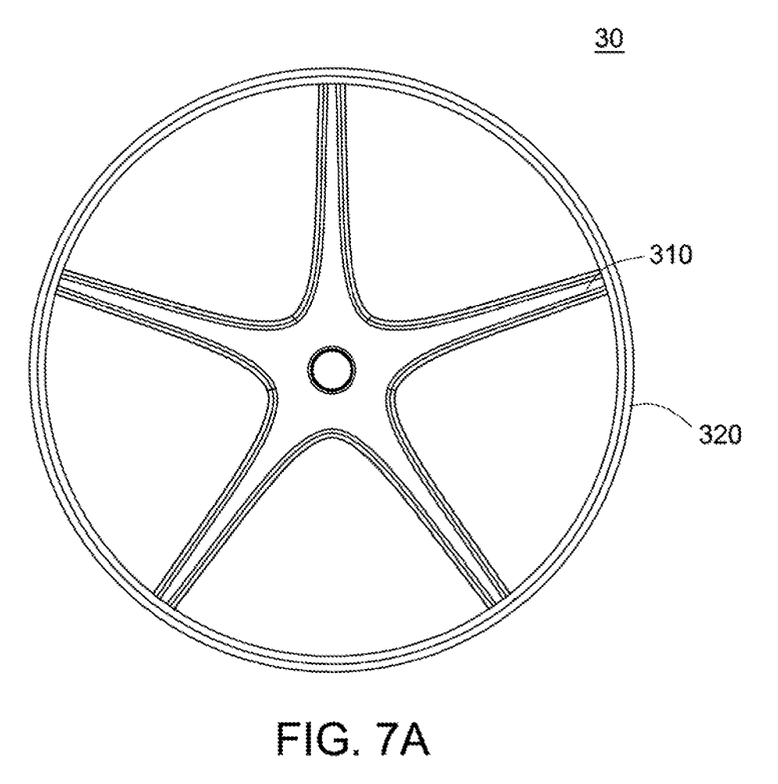
Figure 7B:
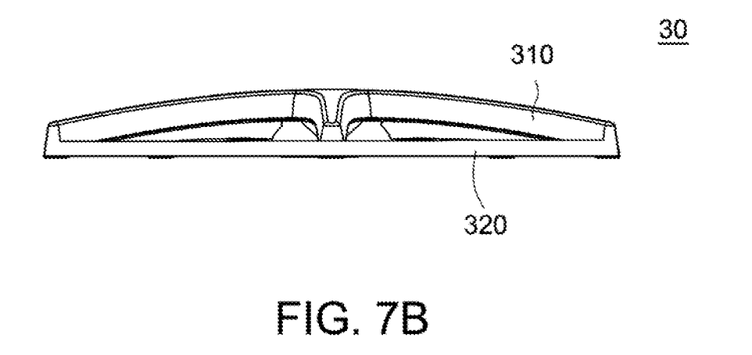

Referring to FIGS. 7A-7B, a third embodiment of the lighted chair base 30 is also disclosed in the present application. The only difference between the lighted chair base 10 (referring to FIG. 1) and lighted chair base 30 is the shape of the base case 310. Specifically, the base case 310 of the lighted chair base 30 is a star-like shape with a ring structure at the periphery.

Figure 8A:
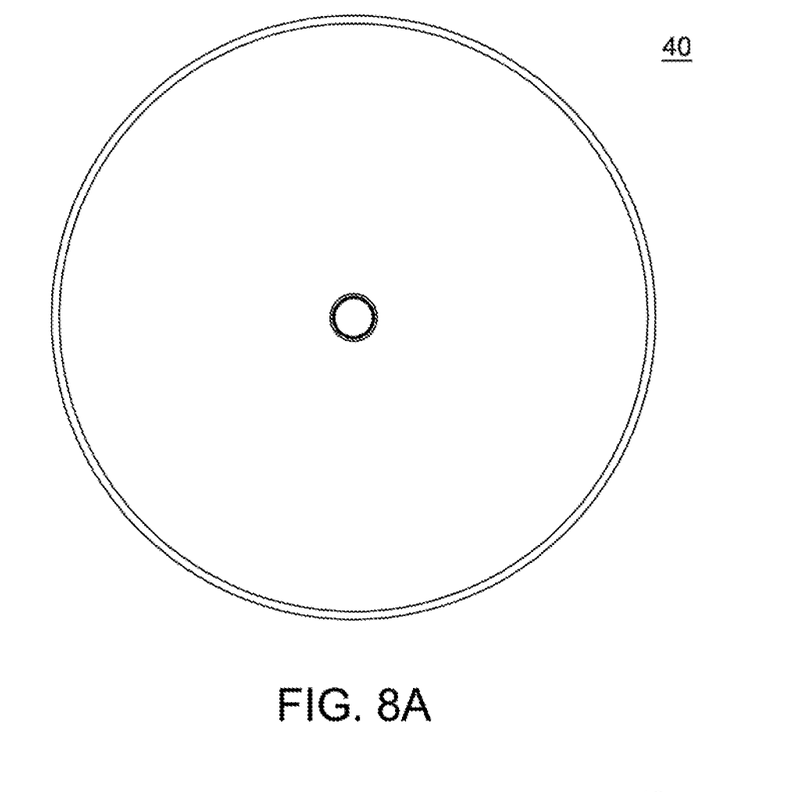
Figure 8B:
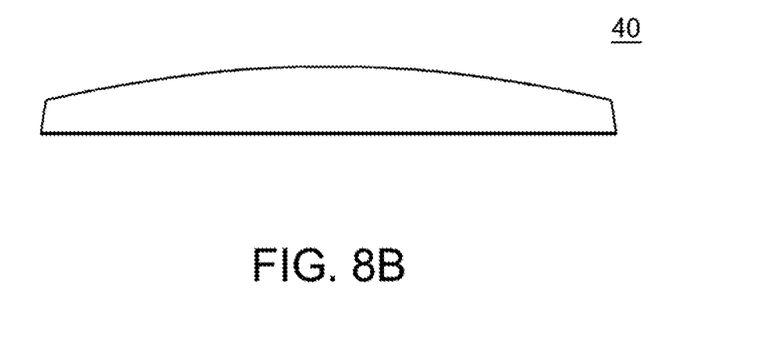

Referring to FIGS. 8A-8B, a fourth embodiment of the lighted chair base 40 is also disclosed in the present application. The only difference between the lighted chair base 10 (referring to FIG. 1) and lighted chair base 40 is the shape of the base case and the base plate. Specifically, the base case and the base plate of the lighted chair base 40 is round. In addition, the positions of every element, such as the power source, the controller, the light emitter and light guiders, are disposed in the similar or same positions as lighted chair base 10 (referring to FIG. 1).

Figure 9A:
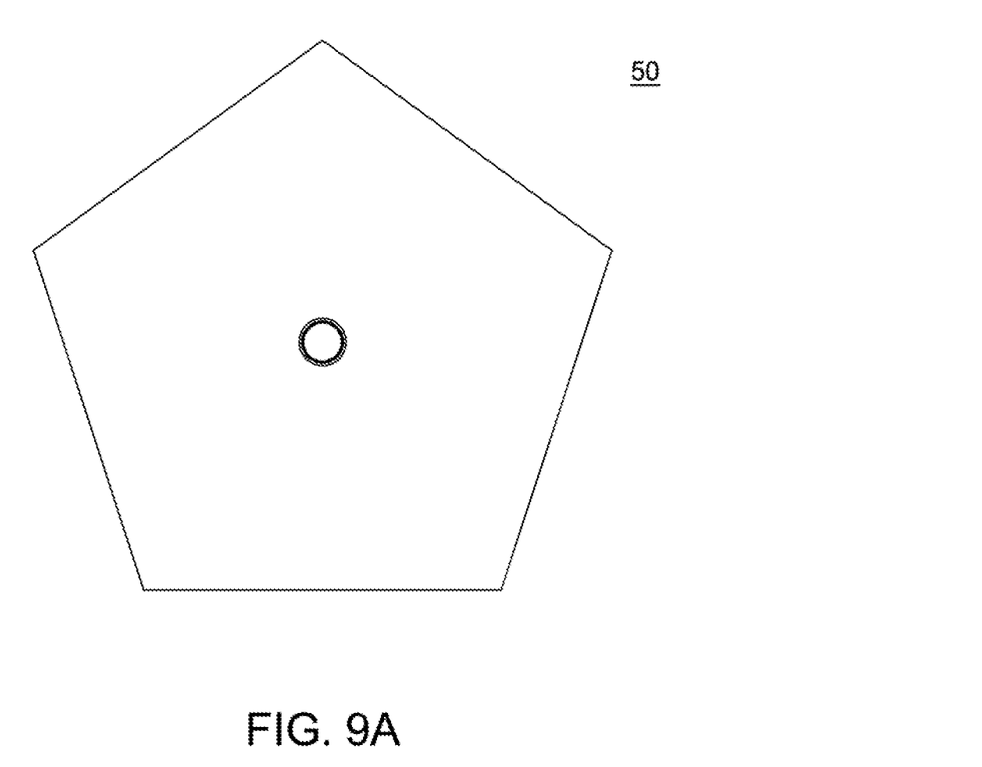
Figure 9B:
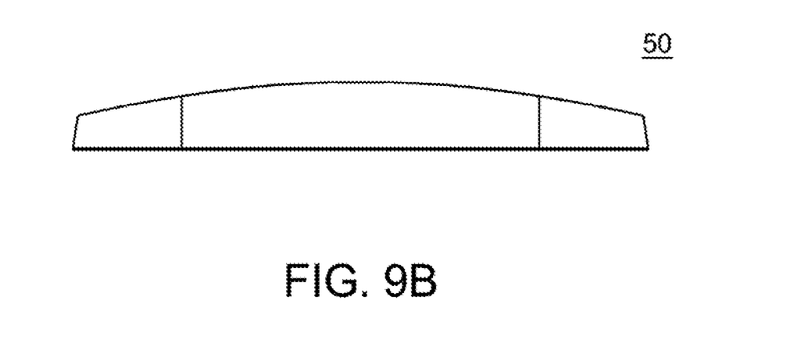

Referring to FIGS. 9A-9B, a fifth embodiment of the lighted chair base 50 is also disclosed in the present application. The only difference between the lighted chair base 40 (referring to FIGS. 8A-8B) and lighted chair base 50 is the shape of the base case and the base plate. Specifically, the base case and the base plate of the lighted chair base 50 is pentagonal.

Except the above example, the present application may also cover the other shape of the base case and the base plate as long as the structure can bring the same or similar lighting effect as shown in above.

Figure 10:
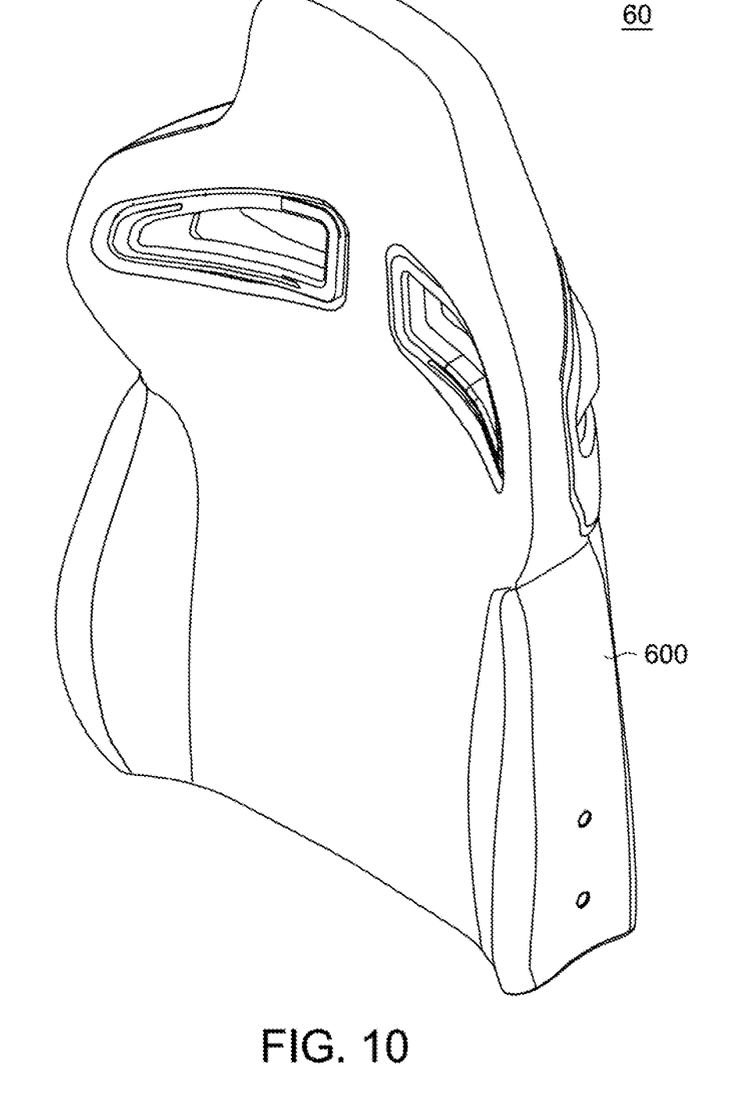
FIG. 10 is a perspective view of a lighted chair back.
Figure 11:
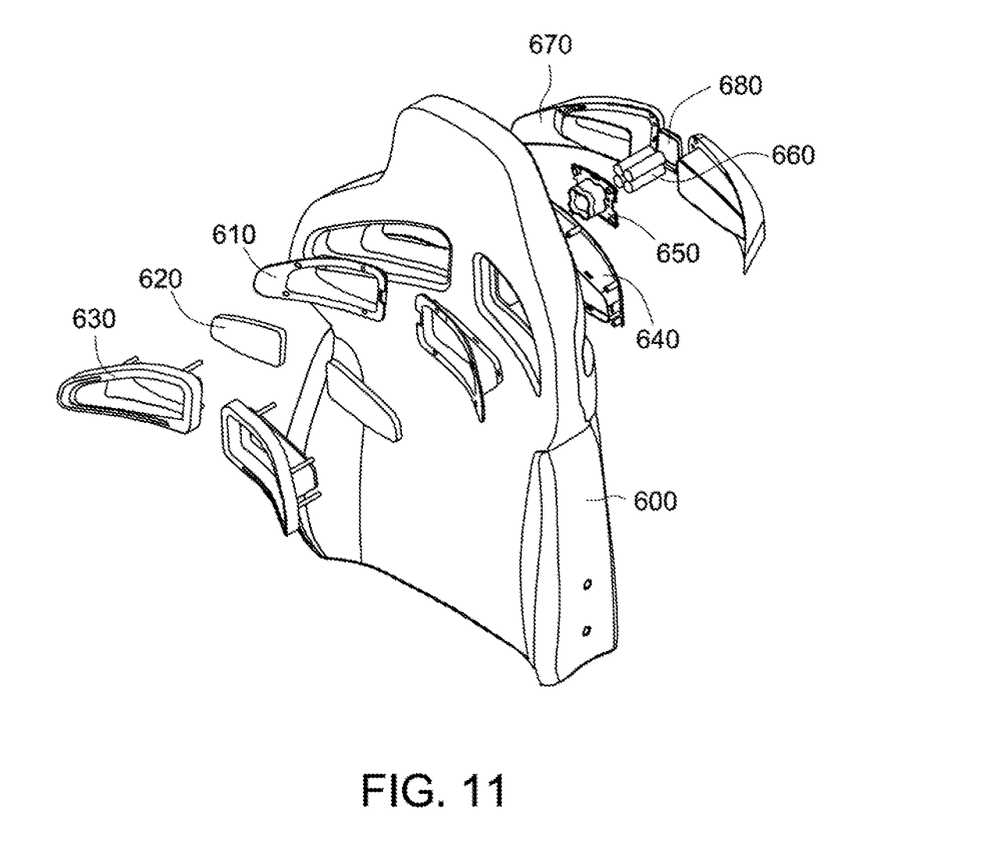
FIG. 11 is a front explosive view of the lighted chair back.
Figure 12:
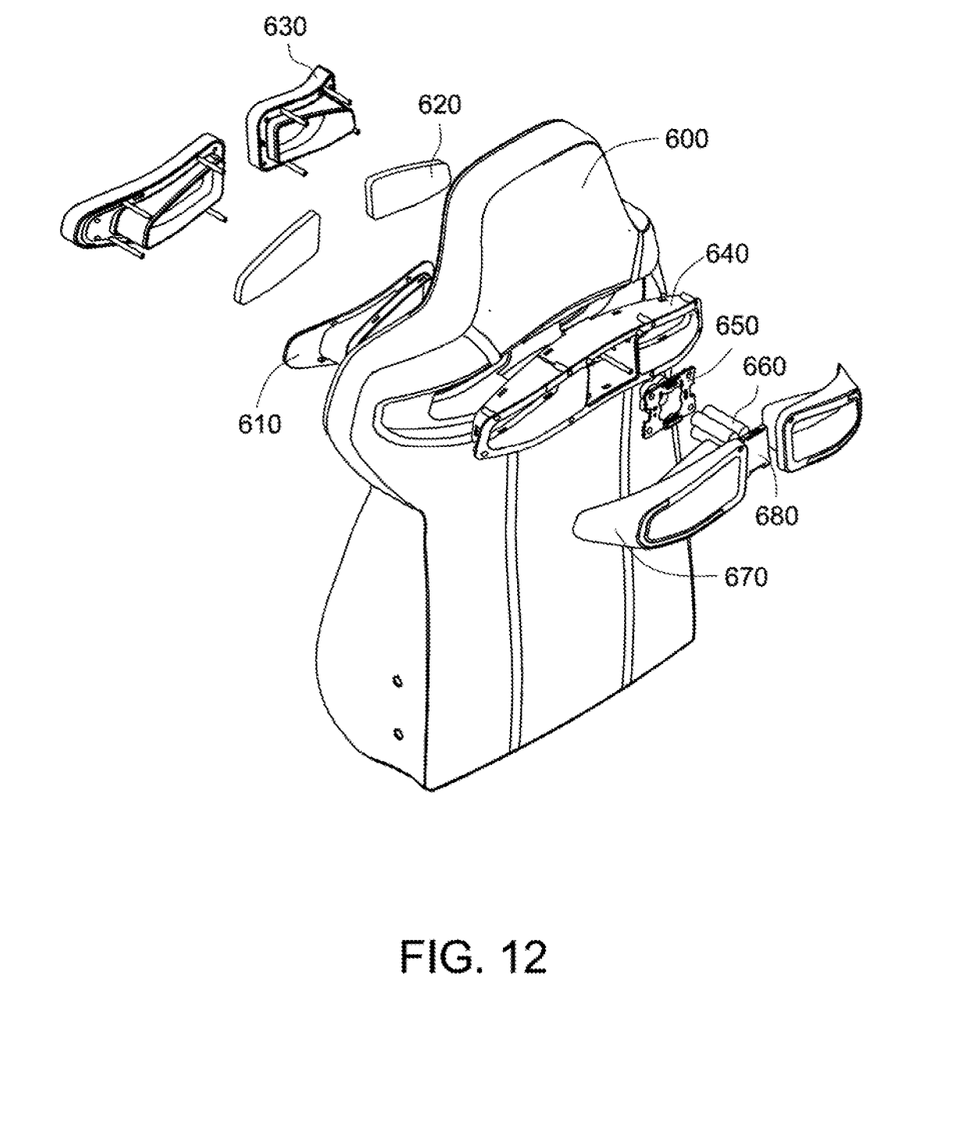
FIG. 12 is a rear explosive view of the lighted chair back.
Figure 13:
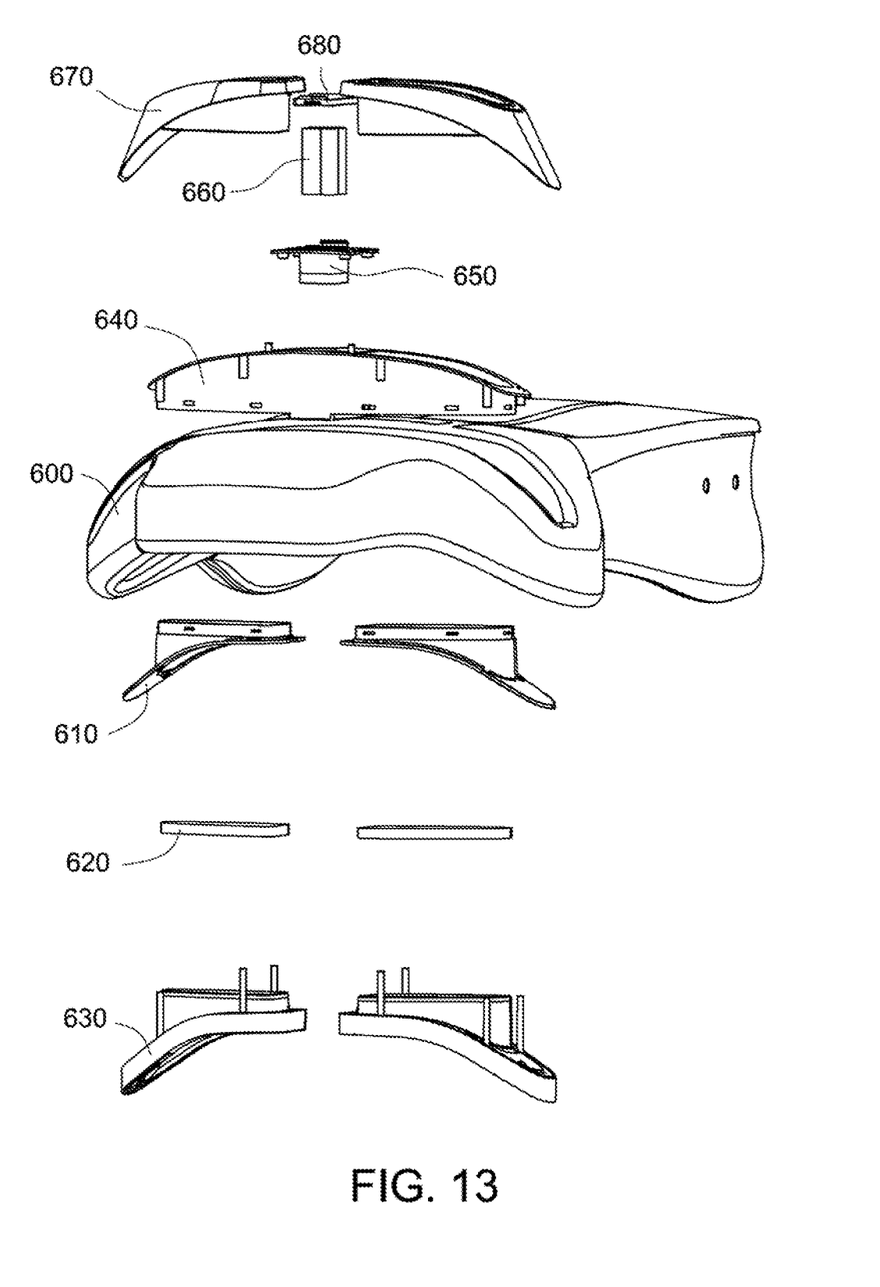
FIG. 13 is a top explosive view of the lighted chair back.

FIG. 10 is a perspective view of a lighted chair back 60. FIG. 11 is a front explosive view of the lighted chair back 60. FIG. 12 is a rear explosive view of the lighted chair back 60. FIG. 13 is a top explosive view of the lighted chair back 60.

The lighted chair back 60 comprises a main body 600, a set of front frames 610, a set of light guiders 620, a set of light emitters 630, a rear frame 640, a controller 650, a power source 660, a set of light emitters 670 and a power source cover 680.

Referring to FIGS. 2 and 11, the set of light guiders 620, the set of light emitters 630, the controller 650, the power source 660 and the set of light emitters 670 have the same function and characteristic, as the light guider 160, the light emitter 150, the controller 140, the poser source 130 and the light emitter 150.

Referring to FIGS. 10-13, the main body 600 comprises a front side and a rear side. Below describe the corresponding locations of each component.

Specifically, referring to FIG. 11, the set of front frames 610, the set of light guiders 620 and the sets of light emitters 630 are coupled to the front side of the main body 600.

The set of front frames 610 is disposed between the front side of the main body 610 and the set of light guiders 620. The set of light guiders 620 is disposed between the set of front frames 610 and the set of the light emitters 630.

Referring to FIG. 12, the rear frame 640, the controller 650, the power source 660, the set of light emitters 670 and the power source cover 680 are coupled to the rear side of the main body 600. The controller 650 is disposed within the rear frame 640. The power source 660 is coupled to the controller 650 and disposed between the controller 650 and the sets of light emitters 670.

It should be noted that the rear side of the main body 600 may also comprises light guider, the present application is not limited thereto. The light guider may be coupled with the set of light emitters 670.

Figure 14:
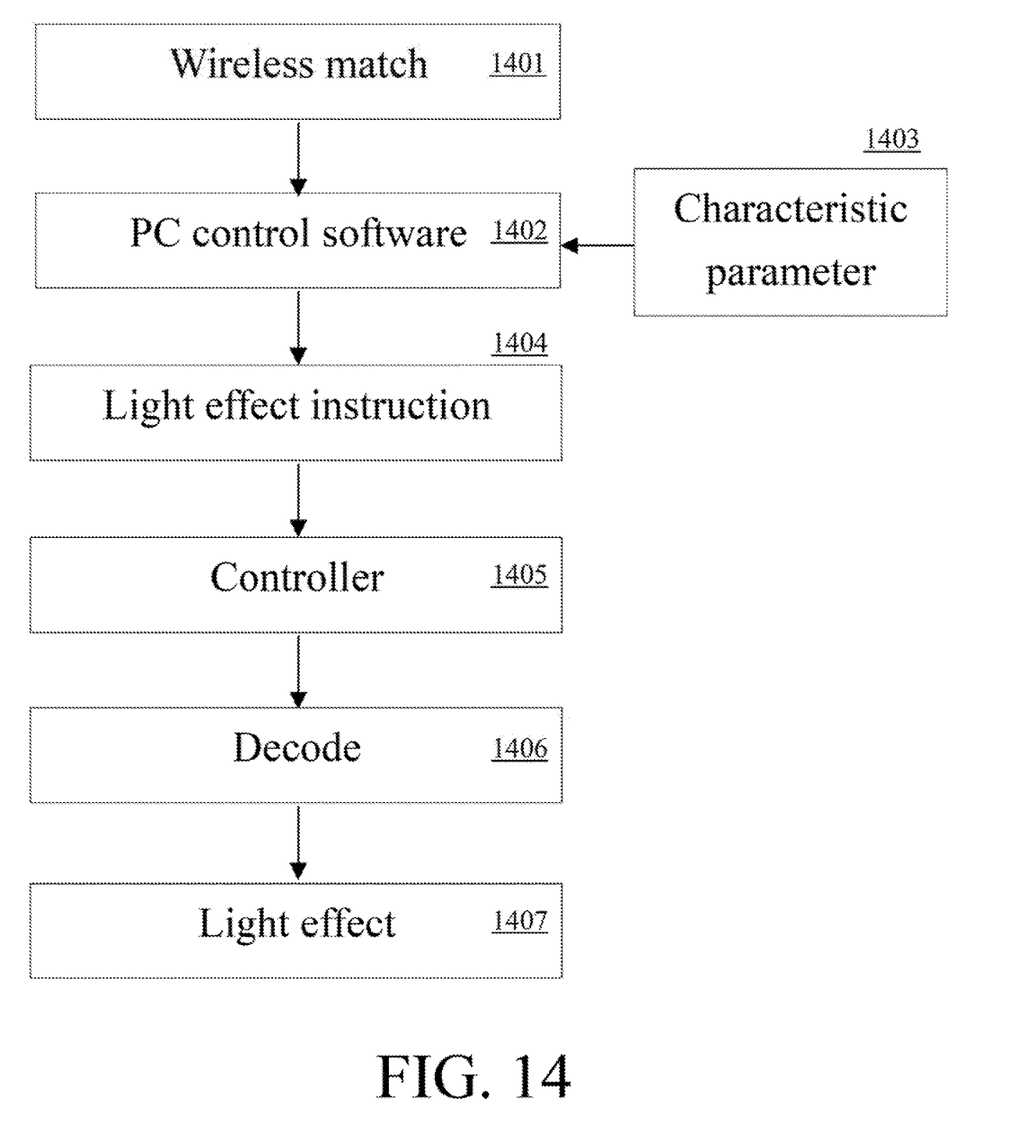
FIG. 14 is a view showing a method for generating light effect.

FIG. 14 is a view showing a method for generating light effect.

In addition to controlling the light effect directly via remote control or wirelessly via mobile app, the lighted chair may also be adjusted according to the software in an electronic device such as a computer.

Referring to FIGS. 2, 12 and 14, a whole light generating system may comprise the electronic device, a control software 1402 installed in the electronic device, the controller 140/650, the light emitter 150/630/670 and the power source 130/660.

The electronic device here is a computer as an example. However, the present application is not limited thereto, the electronic device also can be other electronic device such as laptop, tablet or mobile phone.

As shown in a box 1401, wireless matching the computer and the lighted chair base 10 or lighted chair back 60. After that, a PC control software 1402 may receive characteristic parameter 1403 from the computer and then translate the characteristic parameter 1403 into corresponding light effect instruction 1404. As shown in a box 1405 and a box 1406, the controller 140/650 then receives the light effect instruction 1404 wirelessly from the computer, allowing a chip of the controller 140/650 to decode for corresponding light effect 1407.

It should be noted that the present application here uses wireless control here as an example. However, the present application is not limited thereto, the computer and the lighted chair base or lighted chair back may also be connected via cable.

As an example, CPU loading may increase due to intense game effects. In this situation, the PC control soft-ware 1402 may translate different CPU loading into different light effect instructions and send to the controller 140/650. Therefore, light effects from the lighted chair base 10 and the lighted chair back may interact with the game, improving the playing quality.

As another example, the PC control software 1402 may collect the volume and frequency of music. In this situation, the PC control software 1402 may translate different volume and frequency into different light effect instructions and send to the controller 140/650. Therefore, light effects from the lighted chair base 10 and the lighted chair back may interact with the music.

As the other example, the PC control software 1402 may collect the environment characteristic of a game. In this situation, the PC control software 1402 may translate different environment characteristic into different light effect instructions and send to the controller 140/650. Therefore, light effects from the lighted chair base 10 and the lighted chair back may interact with the game.

Based on the above, the present application provides a safer environment since the light emitters are installed in the chair base and the chair back, preventing people from getting injured when passing it without turning light. In addition, a more market-oriented and personalized chair can be further achieved since the light guiders are installed in the chair base and the chair back, allowing users to set up or select the desired light effect.

It will be apparent to those skilled in the art that various modifications and variations can be made to the structure of the present application without departing from the scope or spirit of the present application. In view of the foregoing, it is intended that the present application cover modifications and variations of this application provided they fall within the scope of the following claims and their equivalents.

What is claimed is:

1. A lighted chair base, comprising:
 a base plate penetrated with at least one slot, and the at least one slot has a top opening and a bottom opening opposite to the top opening;

a base case, coupled to the base plate, comprising an accommodation space;

a power source disposed on the base plate and located within the accommodation space;

a controller located within the accommodation space and electrically coupled to the power source;

at least one light emitter located within the accommodation space and electrically coupled to the controller; and at least one light guider, disposed on the base plate, shielding the top opening of the at least one slot, wherein the at least one light guider is capable of guiding light emitted from the at least one light emitter to illuminate an outside area through the top opening and the bottom opening of the at least one slot.

2. The lighted chair base as claimed in claim 1, wherein the base plate comprises a central and a plurality of peripheral base plates.

3. The lighted chair base as claimed in claim 2, wherein the plurality of peripheral base plates comprises five peripheral base plates.

4. The lighted chair base as claimed in claim 3, wherein the lighted chair base comprises five light guiders disposed on the five peripheral base cases correspondingly.

5. The lighted chair base as claimed in claim 2, wherein the base case comprises a central base case and a plurality of peripheral base cases.

6. The lighted chair base as claimed in claim 5, wherein the plurality of peripheral base cases comprises five peripheral base cases.

7. The lighted chair base as claimed in claim 6, wherein the central base plate and the plurality of peripheral base plates are orthographic projections of the central base case and the plurality of peripheral base cases correspondingly.

8. The lighted chair base as claimed in claim 1, wherein the light emitter comprises a light emitting surface, the light guider comprises a front surface, a rear surface, a right side surface, a left side surface, a top surface and a bottom surface facing the base plate, wherein the light emitting surface faces the bottom surface of the light guider.

9. The lighted chair base as claimed in claim 1, wherein the light emitter comprises a light emitting surface, the light guider comprises a front surface, a rear surface, a right side surface, a left side surface, a top surface and a bottom surface facing the base plate, wherein the light emitting surface faces the front surface of the light guider.

10. The lighted chair base as claimed in claim 1, wherein the light emitter is a light emitting diode.

11. A lighted chair back, comprising:

a main body comprising a first light guider, a front side, and a rear side;

a power source coupled to the main body;

a controller electrically coupled to the power source;

first light emitters disposed at the front side of the main body and electrically coupled to the controller;

second light emitters disposed at the rear side of the main body, electrically coupled to the controller, and coupled with the first light guider;

at least one front frame disposed between the front side of the main body and the first light emitters; and at least one second light guider disposed between the at least one front frame and the first light emitters, and the first light guider and the at least one second light guider guide light emitted from the first light emitters and the second light emitters toward the front side and the rear side of the main body.

12. The lighted chair back as claimed in claim 11, further comprising a rear frame disposed between the rear side of the main body and the at least one light emitter.

13. The lighted chair back as claimed in claim 11, wherein each of the first light emitter and the second light emitter is a light emitting diode.

14. The lighted chair back as claimed in claim 11, wherein the power source is a rechargeable battery.

* * * * *